(12) United States Patent
Fröberg Olsson et al.

(10) Patent No.: US 11,558,895 B2
(45) Date of Patent: Jan. 17, 2023

(54) LOGICAL CHANNEL INDICATOR

(71) Applicant: Telefonaktiebolaget LM Ericsson (publ), Stockholm (SE)

(72) Inventors: Jonas Fröberg Olsson, Ljungsbro (SE); Gustav Wikström, Täby (SE); Zhenhua Zou, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 59 days.

(21) Appl. No.: 17/053,654

(22) PCT Filed: May 9, 2019

(86) PCT No.: PCT/SE2019/050415
§ 371 (c)(1),
(2) Date: Nov. 6, 2020

(87) PCT Pub. No.: WO2019/216817
PCT Pub. Date: Nov. 14, 2019

(65) Prior Publication Data
US 2021/0227573 A1 Jul. 22, 2021

Related U.S. Application Data

(60) Provisional application No. 62/669,185, filed on May 9, 2018.

(51) Int. Cl.
*H04W 4/00* (2018.01)
*H04W 72/14* (2009.01)
*H04W 72/12* (2009.01)

(52) U.S. Cl.
CPC ....... *H04W 72/14* (2013.01); *H04W 72/1242* (2013.01); *H04W 72/1289* (2013.01)

(58) Field of Classification Search
CPC ..... H04W 16/14; H04W 76/15; H04W 72/14; H04W 72/1242
(Continued)

(56) References Cited

U.S. PATENT DOCUMENTS

2015/0365152 A1* 12/2015 Frenne ............... G03G 15/0865
370/252
2018/0007669 A1 1/2018 Yi et al.
(Continued)

OTHER PUBLICATIONS

International Search Report and Written Opinion dated Jul. 3, 2019 for International Application No. PCT/SE2019/050415 filed on May 9, 2019, consisting of 14-pages.
(Continued)

*Primary Examiner* — David Q Nguyen
(74) *Attorney, Agent, or Firm* — Christopher & Weisberg, P.A.

(57) ABSTRACT

A method, network node and wireless device that use grants that restrict the set of LCHs that can be serviced using the grant are disclosed. According to one aspect, a method in a wireless device (WD) configured to communicate with a network node is provided. The method includes receiving from the network node, a first grant for uplink transmission of data, the first grant indicating that use of the first grant is restricted to logical channels (LCHs) of a first subset of LCHs of an LCH set, the first subset of LCHs configured to include fewer than all LCHs, such that there exists at least one LCH for which use of the first grant is not allowed. The method also includes selecting at least one LCH from the first subset of LCHs according to a priority of LCHs in the first subset of LCHs, the selected at least one LCH configured to provide data to be transmitted on the uplink according to the first grant.

18 Claims, 10 Drawing Sheets

(58) Field of Classification Search
USPC .................................. 370/328, 329, 330, 331
See application file for complete search history.

(56) References Cited

U.S. PATENT DOCUMENTS

2018/0310308 A1* 10/2018 Loehr ............... H04W 72/1289
2020/0404691 A1* 12/2020 Wu ....................... H04W 76/27

OTHER PUBLICATIONS

3GPP TSG RAN WG2 NR Ad-hoc 0118 Tdoc R2-1801371; Title: Remaining Issue on SPS/Grant-free: How to Handle Dynamic Grant Coinciding with Configured Grant; Agenda Item: 10.3.1.8; Source: Samsung; Document for: Discussion/Decision; Date and Location: Jan. 22-26, 2018, Vancouver, Canada, consisting of 5-pages.

3GPP TSG-RAN WG2 Meeting #99 R2-1709538; Title: Email Discussion [NR-AH2#15][NR UP] on LCP; Agenda Item: 10.3.1.7; Source: Mediatek Inc.; Document for: Discussion and Decision; Date and Location: Aug. 21-25, 2017, Berlin, Germany, consisting of 16-pages.

3GPP TSG-RAN WG2 #99 Tdoc R2-1709474; Title: Logical channel prioritization and transmission profiles; Agenda Item: 10.3.1.7; Source: Ericsson; Document for: Discussion, Decision; Date and Location: Aug. 21-25, 2017, Berlin, Germany, consisting of 4-pages.

3GPP TSG RAN WG2 #99 R2-1709127; Title: Modelling of Abstraction-based Approach with Profile/Index for LCP; Agenda Item: 10.3.1.7; Source: Samsung; Document for: Discussion/ Decision; Date and Location: Aug. 21-25, 2017, Berlin, Germany, consisting of 4-pages.

* cited by examiner

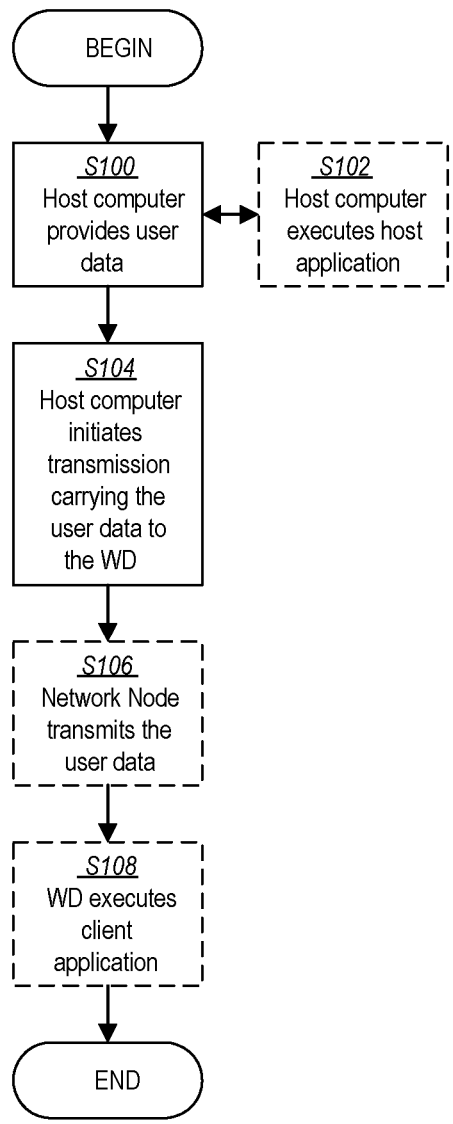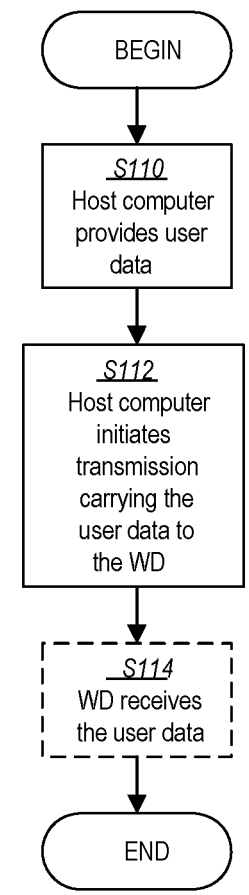
FIG. 3
FIG. 4

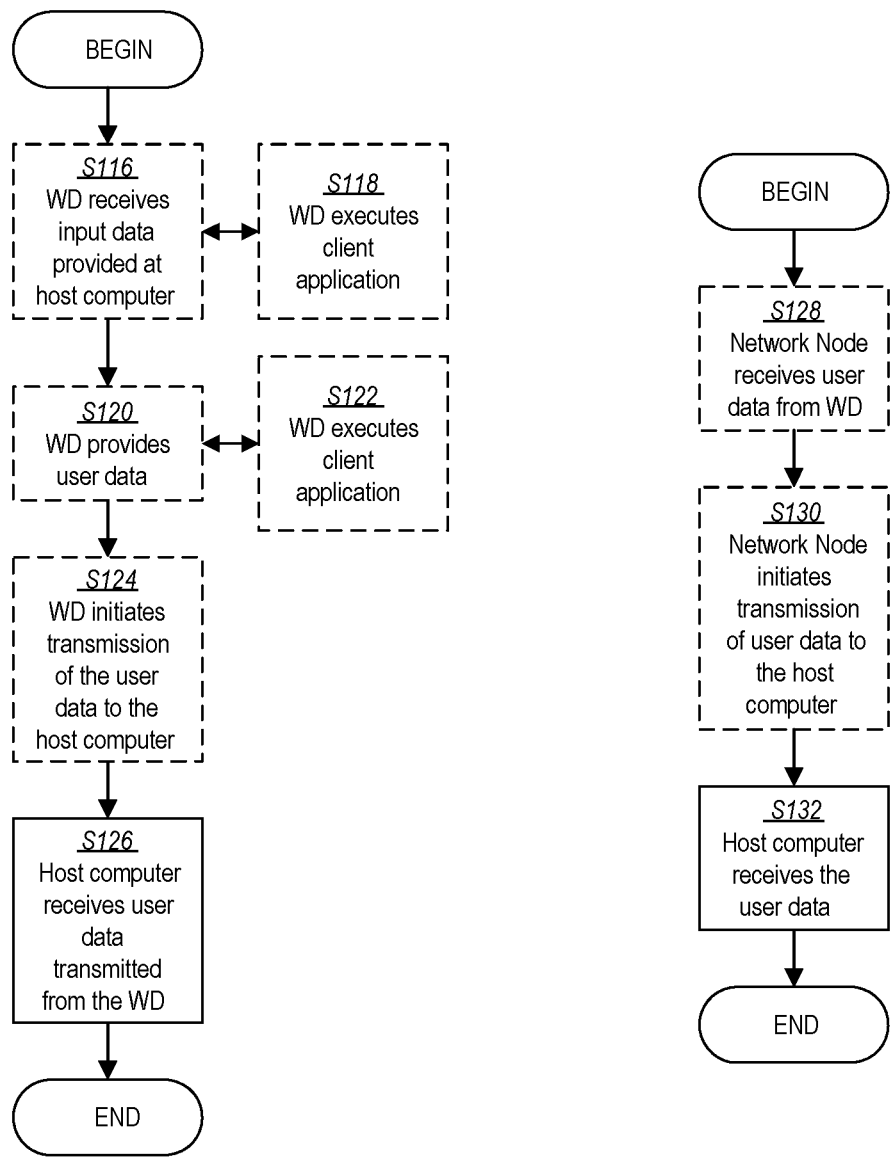

LOGICAL CHANNEL INDICATOR

CROSS-REFERENCE TO RELATED APPLICATIONS

This application is a Submission Under 35 U.S.C. § 371 for U.S. National Stage Patent Application of International Application No.: PCT/SE2019/050415, filed May 9, 2019 entitled "LOGICAL CHANNEL INDICATOR," which claims priority to U.S. Provisional Application No. 62/669,185, filed May 9, 2018, entitled "LOGICAL CHANNEL INDICATOR," the entireties of both of which are incorporated herein by reference.

TECHNICAL FIELD

The present disclosure relates to wireless communications, and in particular, to use of uplink communication grants that restrict the set of logical channels that can be serviced using the grant.

BACKGROUND

In wireless communication systems there typically are a large amount of transmission parameters to be communicated between the communicating entities. Such communication entities may be a network node and a wireless device (WD).

Some transmission parameters are communicated using higher Open System Interconnect (OSI) layer signaling such as RRC (Radio Resource Control) signaling, while other transmission parameters are communicated using lower layer signaling such as DCI (Downlink Control Information) messages.

In Long Term Evolution (LTE) and New Radio (NR) a few examples of RRC configured transmission parameters include:
  Power control configuration parameter;
  CQI (Channel Quality Indicator) table definition, e.g., enable using 256 quadrature amplitude modulation (QAM);
  MCS (Modulation and Coding Scheme) table definition, e.g., enable using 256 QAM; and
  CSI (Channel State Information) acquisition configuration including configuration for multiple CSI processes.

A few example transmission parameters indicated in DCI messages include:
  TPC (Transmit Power Control) command, e.g., a command to change state of the power control instance;
  CSI request, which indicates that the WD will transmit a CSI report. The CSI request may also indicate for which CSI processes the CSI request is for; and
  MCS indicator specifying MCS in a downlink (DL) assignment or uplink (UL) grant to be used by the WD in reception and/or transmission.

A DCI is transmitted over a PDCCH (Physical Downlink Control Channel) and is blindly searched for by the WD. The search performed by the WD includes one or more decoding attempts performed based on a hypothetical PDCCH located in a pre-defined time-frequency location, called a search space entry. The set of time-frequency locations where a PDCCH may be received is called a search space. In New Radio (NR), the region of time-frequency resources in which a search space is defined is called a CORESET (Control Region Set) and can be flexibly configured. A WD can have several CORESETs configured.

In NR (and also in LTE Rel-15), support for URLLC (Ultra-Reliable Low-Latency Communication) services is contemplated. For URLLC services there are extreme latency and robustness requirements. The requirements on latency and robustness can be as low as 1 ms and $10^{-5}$, respectively.

NR supports two types of configured grants, Type 1 and Type 2. For Type 1, the WD is RRC configured with a grant that indicates all needed transmission parameters. For Type 2, the configured grant is partly RRC configured and partly signaled using OSI Layer 1 (L1). NR further supports two types of transmissions, Type A and Type B. For Type A, transmissions are slot-based, where a slot is defined as 14 orthogonal frequency division multiplexed (OFDM) symbols. Type B is non-slot-based. Type B transmissions are short transmissions that can start and end more flexibly than Type A transmissions.

For uplink (UL) grants, e.g., grants for communication from the WD to the network node, the WD multiplexes data from Logical Channels (LCHs). The multiplexing is performed in order of priority. Data is taken from high-priority LCHs first according to a prioritized bitrate of the LCH. If there is room for more data then data from lower-priority LCHs is also added according to their respective prioritized bit rates. For NR, the Logical Channel Prioritization (LCP) is controlled by RCC and mapping restrictions can be imposed on each logical channel according to Third Generation Partnership Project (3GPP) Technical Standard (TS) 38.321, Section 5.4.3.1.1:
  allowedSCS-List which sets the allowed Subcarrier Spacing(s) for transmission;
  maxPUSCH-Duration which sets the maximum physical uplink shared channel (PUSCH) duration allowed for transmission;
  configuredGrantType1Allowed which sets whether a configured Grant Type 1 can be used for transmission; and
  allowedServingCells which sets the allowed cell(s) for transmission.

The maxPUSCH-Duration for the LCH places a restriction on the LCH such that the LCH may not use a grant that indicates a PUSCH duration that is longer than the maxPUSCH-Duration. The allowedSCS-List parameter indicates the numerologies that are allowed for this LCH. If a grant is associated with a numerology with SCS (Sub-Carrier Spacing) K and K is not included in the allowedSCS-List parameter of a LCH, then data from this LCH may not be transmitted using the grant. The configuredGrant-Type1Allowed parameter indicates whether the LCH may use a configured grant Type 1 or not.

The LCH restrictions using allowedSCS-List and maxPUSCH-Duration enable the NR base station (gNB) to control which LCHs can use a certain grant. As long as URLLC uses shorter transmissions than enhanced Mobile Broadband (eMBB), or if URLLC and eMBB run different numerologies, the gNB can exercise control so that URLLC data may not be transmitted using a grant intended for eMBB. However, if eMBB and URLLC run simultaneously using a same transmission length and numerology, there may be no way to restrict an eMBB LCH to use a grant intended for URLLC.

When the same numerology and same transmissions lengths are used for eMBB and URLLC, then for a WD running URLLC traffic in one LCH and other traffic types (e.g., eMBB) in another LCH, the current multiplexing rules establish that, when a WD receives a grant, the WD may service the URLLC LCH first. If the grant allows room for more data, then the eMBB data may also be multiplexed using that grant. Due to the robustness requirements of URLLC being more demanding than for eMBB traffic, a grant transmitted to a WD intended for eMBB that is used for URLLC data may fail robustness requirements. Since NR supports scheduling requests (SR) indicating a set of LCH, there is a mechanism for WDs to indicate to a gNB if a grant suitable for eMBB or URLLC is requested. If eMBB is first to arrive in a WD buffer, the WD will transmit a SR indicating an "eMBB" request. The gNB will respond with a grant suitable for eMBB. When the WD receives the "eMBB" grant, URLLC data may also arrive. With current LCH restrictions, the WD may transmit URLLC data using the "eMBB" grant.

Another problem occurs for configured grant Type 2 where the WD is configured with a resource such that it may transmit data without receiving a DCI on the PDCCH. Due to the strict latency requirements for URLLC, a configured grant is beneficial to be used for URLLC. But if the WD has a configured grant and eMBB traffic arrives, the WD may transmit eMBB data on the configured grant resource. If the configured grant resource is a shared resource (shared between URLLC WDs) intended for URLLC traffic only, those eMBB transmissions may collide with other URLLC transmissions and those URLLC transmission may risk failing to meet the robustness and latency requirements.

SUMMARY

Some embodiments advantageously provide methods, network nodes and wireless devices that use uplink grants that restrict the set of logical channels that can be serviced using the grant. According to one aspect, a method in a wireless device (WD) configured to communicate with a network node is provided. The method includes receiving from the network node, a first grant for uplink transmission of data, the first grant indicating that use of the first grant is restricted to logical channels, LCHs, of a first subset of LCHs of an LCH set, the first subset of LCHs configured to include fewer than all LCHs, such that there exists at least one LCH for which use of the first grant is not allowed. The method also includes selecting at least one LCH from the first subset of LCHs according to a priority of LCHs in the first subset of LCHs, the selected at least one LCH configured to provide data to be transmitted on the uplink according to the first grant.

Embodiments include a method to transmit data from two or more LCHs according to a grant wherein said grant (dynamic or configured) is associated with a subset of the LCHs. For a configured grant, the association may comprise a list of LCHs which may use the configured grant. This effectively modifies the legacy prioritized bitrate rule by introducing grants that restrict the set of LCHs that can be serviced using that grant (i.e., instead of allowing all LCHs with available data to be serviced by a grant as per the legacy prioritized bit rate rule).

For dynamic grants, the DCI may comprise an explicit field (e.g., a LCH set indicator) or may implicitly indicate for which LCHs the grant is intended.

For cases with an explicit indicator, the meaning of the indicator may be RRC-configured semi-statically indicating which set of LCHs is granted. For example, a first and second set of LCHs may be configured. Where a 1-bit LCH set indicator in DCI would be the value "0," the LCH set indicator may indicate the first set of LCHs while the second set of LCHs is indicated otherwise.

For the examples with an implicit indicator, the DCI format or formatting may be configured/associated with a set of LCHs (e.g., URLLC only LCHs). An implicit indicator may also be associated with the radio network temporary identifier (RNTI) or with the CORESET/search space upon which the DCI was received.

According to one aspect, a wireless device, WD, configured to communicate with a network node, includes processing circuitry configured to receive from the network node, a first grant for uplink transmission of data, the first grant indicating that use of the first grant is restricted to logical channels (LCHs) of a first subset of LCHs of an LCH set, the first subset of LCHs configured to include fewer than all LCHs, such that there exists at least one LCH for which use of the first grant is not allowed. The processing circuitry is further configured to select at least one LCH from the first subset of LCHs according to a priority of LCHs in the first subset of LCHs, the selected at least one LCH configured to provide data to be transmitted on the uplink according to the first grant.

According to this aspect, in some embodiments, the at least one LCH selected from the first subset of LCHs is an LCH having a highest priority of all the LCHs in the first subset of LCHs. In some embodiments, the processing circuitry is further configured to cause transmission of data on the selected at least one LCH from the first subset of LCHs on transmission resources indicated by the first grant, regardless of whether LCHs not in the first subset of LCHs have higher priority than the LCHs included in the first subset of LCHs. In some embodiments, the processing circuitry is further configured to: receive a second grant for uplink transmission, the second grant indicating a transmission time that overlaps a transmission time indicated by the first grant, the second grant indicating that use of the second grant is restricted to LCHs of a second subset of LCHs in the LCH set. The processing circuitry is further configured to select, for transmission according to one of the two grants, data from an LCH that has a priority that is a highest priority within the subset of LCHs indicated by the one of the two grants, which priority is also higher than a priority of the LCH of highest priority within the other subset of LCHs. In some embodiments, the processing circuitry is further configured such that the first grant being received when a second grant is already being processed results in disruption of the processing of the second grant while performing processing of the first grant. In some embodiments, when the first grant includes a channel state information, CSI, request, the WD is configured to refrain from transmitting CSI when a grant to be used for transmission is different from the first grant. In some embodiments, the grant to be used for transmission is a configured grant and when the CSI is requested in a dynamic grant, the WD is configured such that no CSI is transmitted. In some embodiments, when the grant to be used for transmission is a second grant received after the first grant, and the first grant includes a CSI request, and the second grant does not include a CSI request, the WD is configured such that the CSI is not transmitted by the WD. In some embodiments, the first grant implicitly indicates by at least one of a specific downlink control information, DCI, format and how the DCI was received, that use of the first grant is restricted to LCHs of the first subset of LCHs. In some embodiments, when two received grants are conflicting because of overlapping resources and both grants indicate a same LCH, the WD is configured to use a dynamic grant if one of the two grants is dynamic and the other grant is configured, and to use a latest received dynamic grant if both grants are dynamic.

According to another aspect, a method in a wireless device, WD, configured to communicate with a network node is provided. The method includes receiving from the network node, a first grant for uplink transmission of data, the first grant indicating that use of the first grant is restricted to logical channels (LCHs) of a first subset of LCHs of an LCH set, the first subset of LCHs configured to include fewer than all LCHs, such that there exists at least one LCH for which use of the first grant is not allowed. The method further includes selecting at least one LCH from the first subset of LCHs according to a priority of LCHs in the first subset of LCHs, the selected at least one LCH configured to provide data to be transmitted on the uplink according to the first grant.

According to this aspect, in some embodiments, the at least one LCH selected from the first subset of LCHs is an LCH having a highest priority of all the LCHs in the first subset of LCHs. In some embodiments, the processing circuitry is further configured to cause transmission of data on the selected at least one LCH from the first subset of LCHs on transmission resources indicated by the first grant, regardless of whether LCHs not in the first subset of LCHs have higher priority than the LCHs included in the first subset of LCHs. In some embodiments, the processing circuitry is further configured to receive a second grant for uplink transmission of data, the second grant indicating a transmission time that overlaps a transmission time indicated by the first grant, the second grant indicating that use of the second grant is restricted to LCHs of a second subset of LCHs in the LCH set. In some embodiments, the processing circuitry is further configured to select, for transmission according to one of the two grants, data from an LCH that has a priority that is highest priority within the subset of LCHs indicated by the one of the two grants, which priority is also higher than a priority of an LCH of highest priority within the other subset of LCHs. In some embodiments, the first grant being received when a second grant is already being processed results in disruption of the processing of the second grant while performing processing of the first grant. In some embodiments, when the first grant includes a channel state information, CSI, request, the WD refrains from transmitting CSI when a grant to be used for transmission is different from the first grant. In some embodiments, when the grant to be used for transmission is a configured grant and the CSI is requested in a dynamic grant, then no CSI is transmitted. In some embodiments, when the grant to be used for transmission is a second grant received after the first grant, and wherein the first grant includes a CSI request, and the second grant does not include a CSI request, then the CSI is not transmitted by the WD. In some embodiments, the first grant implicitly indicates by at least one of a specific downlink control information, DCI, format and how the DCI was received, that use of the first grant is restricted to LCHs of the first subset of LCHs. In some embodiments, when two received grants are conflicting because of overlapping resources and both grants indicate a same LCH, a dynamic grant is used if one grant is dynamic and the other grant is configured, and if both grants are dynamic a latest received dynamic grant is used.

According to yet another aspect, a network node configured to communicate with a wireless device, WD, includes processing circuitry configured to generate at least one grant for uplink transmission of data for the WD, the at least one grant indicating that use of the at least one grant is restricted to logical channels (LCHs) of a first subset of at least one LCH of an LCH set, the first subset of LCHs including fewer than all LCHs, such that there exists at least one LCH for which use of the at least one grant is not allowed. The processing circuitry is further configured to transmit the at least one grant to the WD.

According to this aspect, in some embodiments, the at least one grant implicitly indicates by at least one of a specific downlink control information, DCI, format and how the DCI was received, that use of the first grant is restricted to LCHs of the first subset of LCHs. In some embodiments, the at least one grant indicates a set of layer one, L1, transmission parameters to be used by the WD. In some embodiments, the L1 transmission parameters are associated with the LCHs of the first subset of LCHs. In some embodiments, the processing circuitry further configured to send instructions to configure the WD with the LCH set. In some embodiments, the processing circuitry is further configured to configure the WD with the LCH set by radio resource control, RRC, signaling. In some embodiments, the LCH set is preconfigured in the network node and the WD.

According to another aspect, a method in a network node configured to communicate with a wireless device, WD, is provided. The method includes generating at least one grant for uplink transmission of data for the WD, the at least one grant indicating that use of the at least one grant is restricted to logical channels, LCHs, of a first subset of LCHs of an LCH set, the first subset of LCHs including fewer than all LCHs, such that there exists at least one LCH for which use of the at least one grant is not allowed. The method includes transmitting the at least one grant to the WD.

According to this aspect, in some embodiments, the at least one grant implicitly indicates by at least one of a specific downlink control information, DCI, format and how the DCI was received, that use of the first grant is restricted to LCHs of the first subset of LCHs. In some embodiments, the at least one grant indicates a set of layer one, L1, transmission parameters to be used by the WD. In some embodiments, the L1 transmission parameters are associated with the LCHs of the first subset of LCHs. In some embodiments, the processing circuitry further sends instructions to configure the WD with the LCH set. In some embodiments, the processing circuitry further configures the WD with the LCH set by radio resource control, RRC, signaling. In some embodiments, the LCH set is pre-configured in the network node and the WD.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
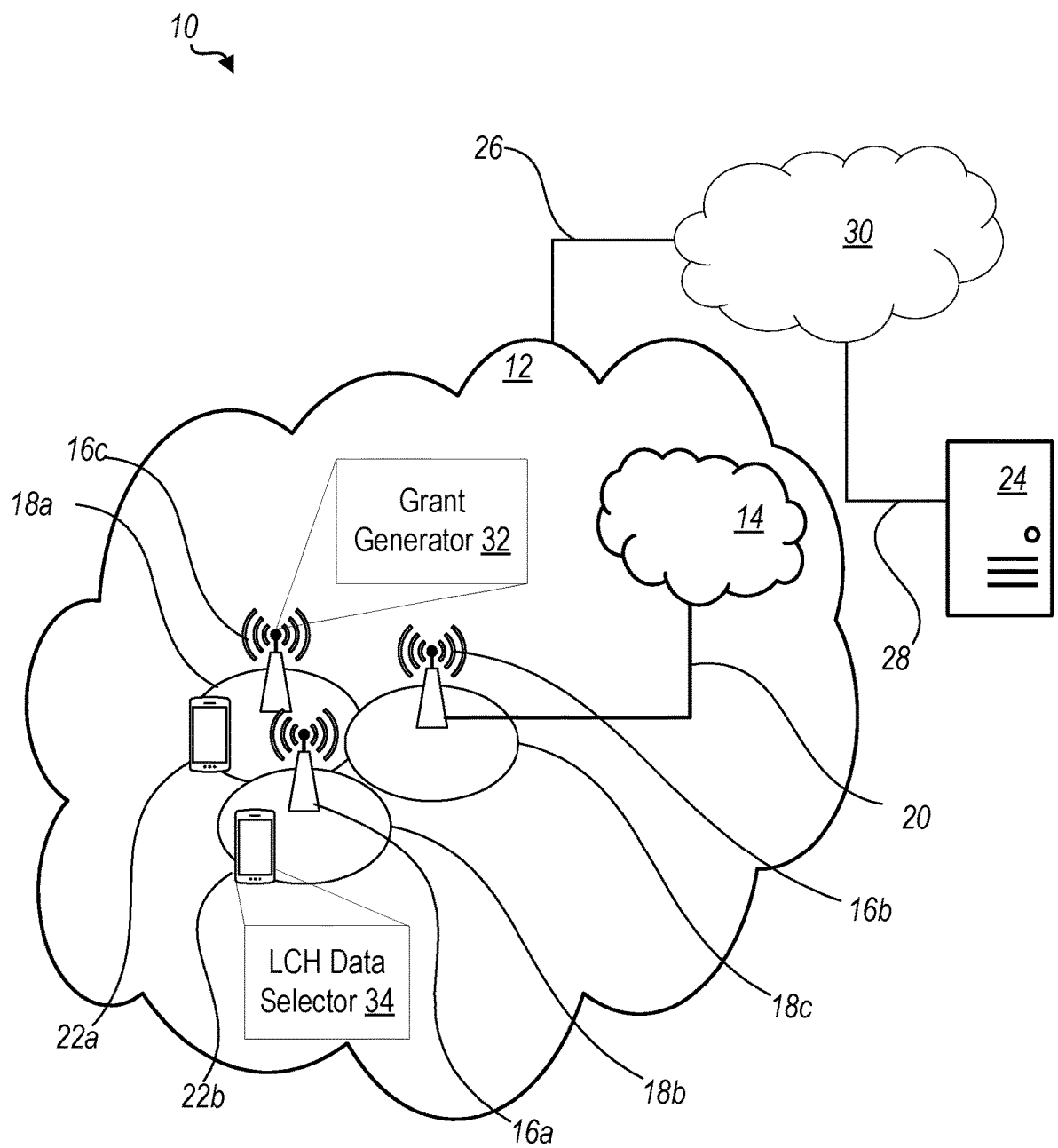
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to use of uplink grants that restrict the set of logical channels that can be serviced using the grant. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

The term signal used herein can be any physical signal or physical channel. Examples of physical signals are reference signal such as PSS, SSS, CRS, and PRS, etc. The term physical channel (e.g., in the context of channel reception) used herein is also called as 'channel. Examples of physical channels are MIB, PBCH, NPBCH, PDCCH, PDSCH, sPUCCH, sPDSCH, sPUCCH, sPUSCH, MPDCCH, NPDCCH, NPDSCH, E-PDCCH, PUSCH, PUCCH, NPUSCH etc. These terms/abbreviations may be used according to 3GPP standard language, in particular according to LTE.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, or IAB node to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DM-RS according to 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Data or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for grants that restrict the set of LCHs that can be serviced using the grant. By restricting the set of LCHs that can be serviced using the grant, robustness and low latency can be preserved. According to one aspect, a network node configures a WD using radio resource control, RRC, signaling to have at least one LCH set, each set comprising at least one LCH and possibly also a set of transmission parameters. The network node also generates at least one grant for the WD, each grant indicating an LCH set, thereby restricting the set of LCHs that can be serviced by the grant. According to another embodiment, a wireless device obtains at least one grant from the network node, selects a grant to be used for transmission, selects data from an LCH of the LCH set, determines L1 transmission parameters, and transmits the selected data according to the L1 transmission parameters.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a grant generator 32 which is configured to generate at least one grant for the WD 22, each grant indicating a use of the at least one grant restricted to logical channels of a first subset of the LCH set, where the first subset of LCHs includes fewer than all LCHs, such that there exists at least one LCH for which use of the at least one grant is not allowed. The wireless device 22 is configured to select at least one LCH from the first subset Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a grant generator 32 which is configured to generate at least one grant for the WD 22, each grant indicating a use of the at least one grant to restricted to logical channels of a first subset of the LCH set, where the first subset of LCHs includes fewer than all LCHs, such that there exists at least one LCH for which use of the at least one grant is not allowed.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an LCH data selector 34 which is configured to select at least one LCH from a first subset. The WD 22 also includes a transmission parameter determiner 94 configured to determine L1 transmission parameters for transmission by the WD based on the selected grant.

Figure 2:
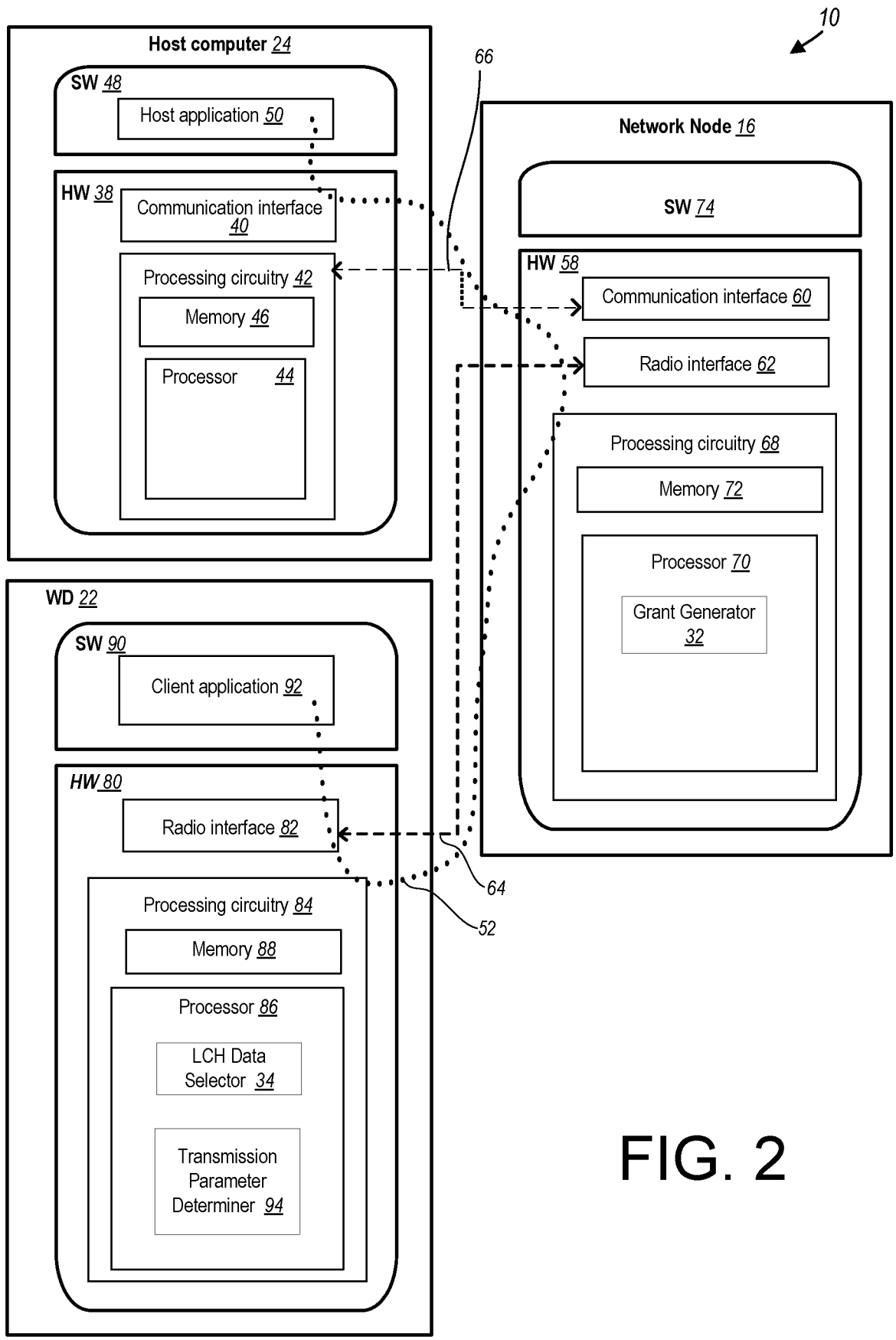
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as a grant generator 32, and an LCH data selector 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 50 executed by the host computer 24 (block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 7:
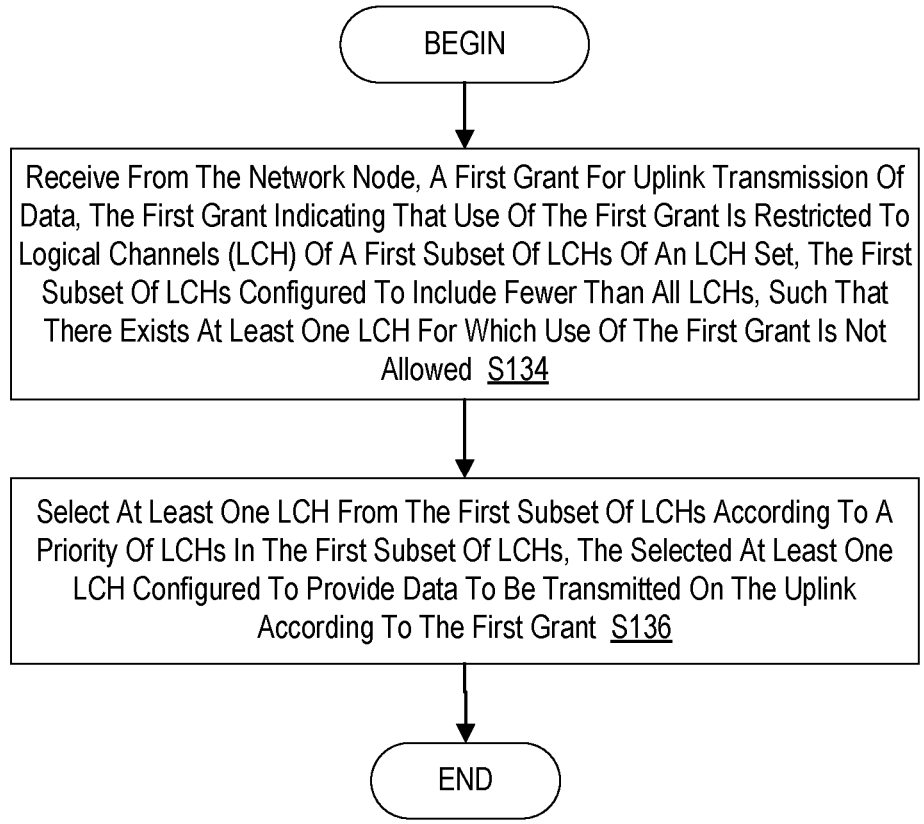
FIG. 7 is a flowchart of an exemplary process in a wireless device that use uplink grants that restrict the set of logical channels that can be serviced using the grant according to some embodiments of the present disclosure.

FIG. 7 is a flowchart of an exemplary process in a wireless device 22 according to some embodiments of the present disclosure. One or more blocks described herein may be performed by one or more elements of wireless device 22 such as by one or more of processing circuitry 84 (including the LCH data selector unit 34), processor 86, radio interface 82 and/or communication interface 60. Wireless device 22 such as via processing circuitry 84 and/or processor 86 and/or radio interface 82 is configured to receive from the network node, a first grant for uplink transmission of data, the first grant indicating that use of the first grant is restricted to logical channels (LCHs) of a first subset of LCHs of an LCH set, the first subset of LCHs configured to include fewer than all LCHs, such that there exists at least one LCH for which use of the first grant is not allowed (Block S134). The process also includes selecting at least one LCH from the first subset of LCHs according to a priority of LCHs in the first subset of LCHs, the selected at least one LCH configured to provide data to be transmitted on the uplink according to the first grant (Block S136).

Figure 8:
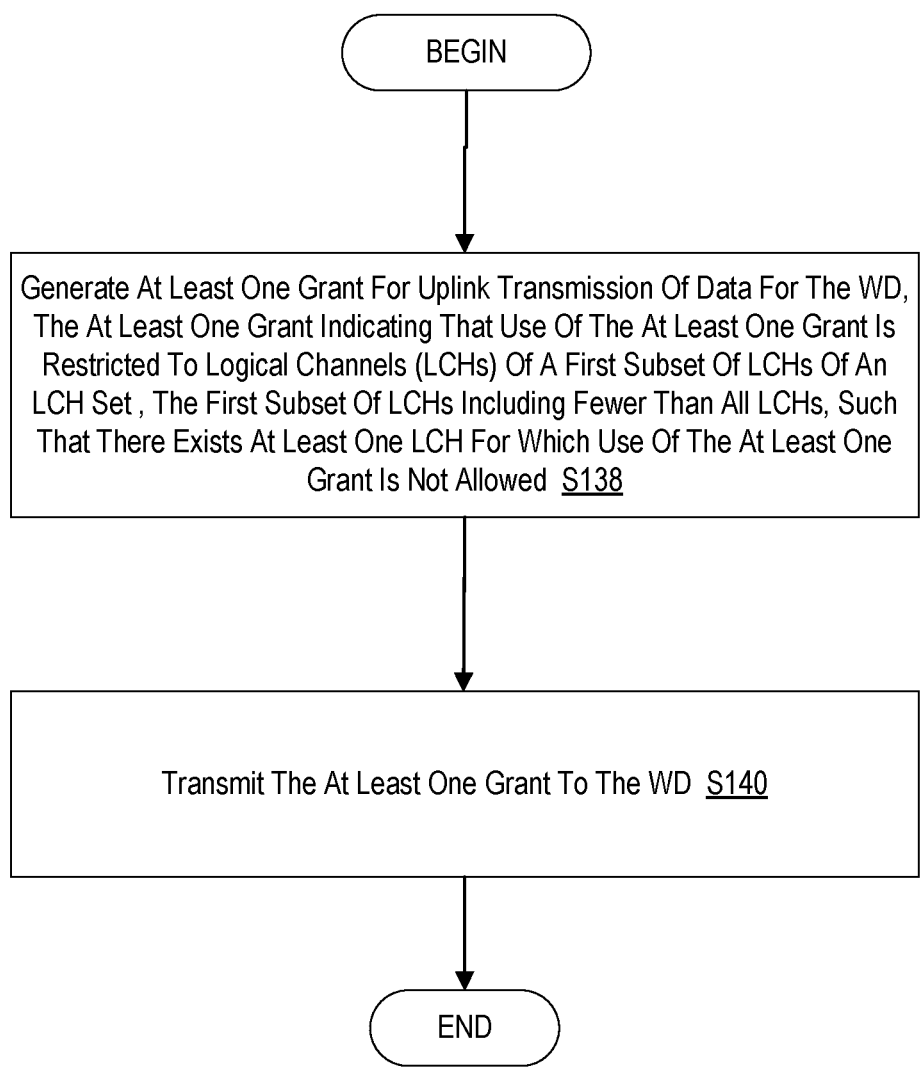
FIG. 8 is a flowchart of an exemplary process in a network node that uses uplink grants that restrict the set of logical channels that can be serviced using the grant according to some embodiments of the present disclosure.

FIG. 8 is a flowchart of an exemplary process in a network node 16 for generating grants that restrict the set of LCHs that can be serviced using the grant. One or more blocks described herein may be performed by one or more elements of network node 16 such as by one or more of processing circuitry 68 (including the grant generator unit 32), processor 70, radio interface 62 and/or communication interface 60. Network node 16 such as via processing circuitry 68 and/or processor 70 and/or radio interface 62 and/or communication interface 60 is configured to generate at least one grant for uplink transmission of data for the WD, the at least one grant indicating that use of the at least one grant is restricted to logical channels of a first subset of logical channels, LCHs, of an LCH set, the first subset of LCHs including fewer than all LCHs, such that there exists at least one LCH for which use of the at least one grant is not allowed (Block S138). The process also includes transmitting the at least one grant to the WD (Block S140).

Having described the general process flow of arrangements of the disclosure and having provided examples of hardware and software arrangements for implementing the processes and functions of the disclosure, the sections below provide details and examples of arrangements for generating and utilizing grants that restrict the set of LCHs that can be serviced using the grant. The grant may be restricted by permitting data of only a first set of LCHs to be transmitted.

A WD 22 is configured by the network node 16, for example, semi-statically over RRC signaling, in Step 0 to have one or more "LCH sets", each set comprising:
  One or more LCH; and
  A set of transmission parameters, which can include MCS table, CQI table, WD 22 timing, repetition factor (slot or "mini-slot" aggregation) and repetition periodicity, etc.

The sets can overlap, and the union of the sets does not need to cover all LCHs. Thus, in some embodiments, an LCH set may contain at least one LCH, but fewer than all LCHs, such that there exists at least one LCH for which use of a grant is not allowed.

Figure 9:
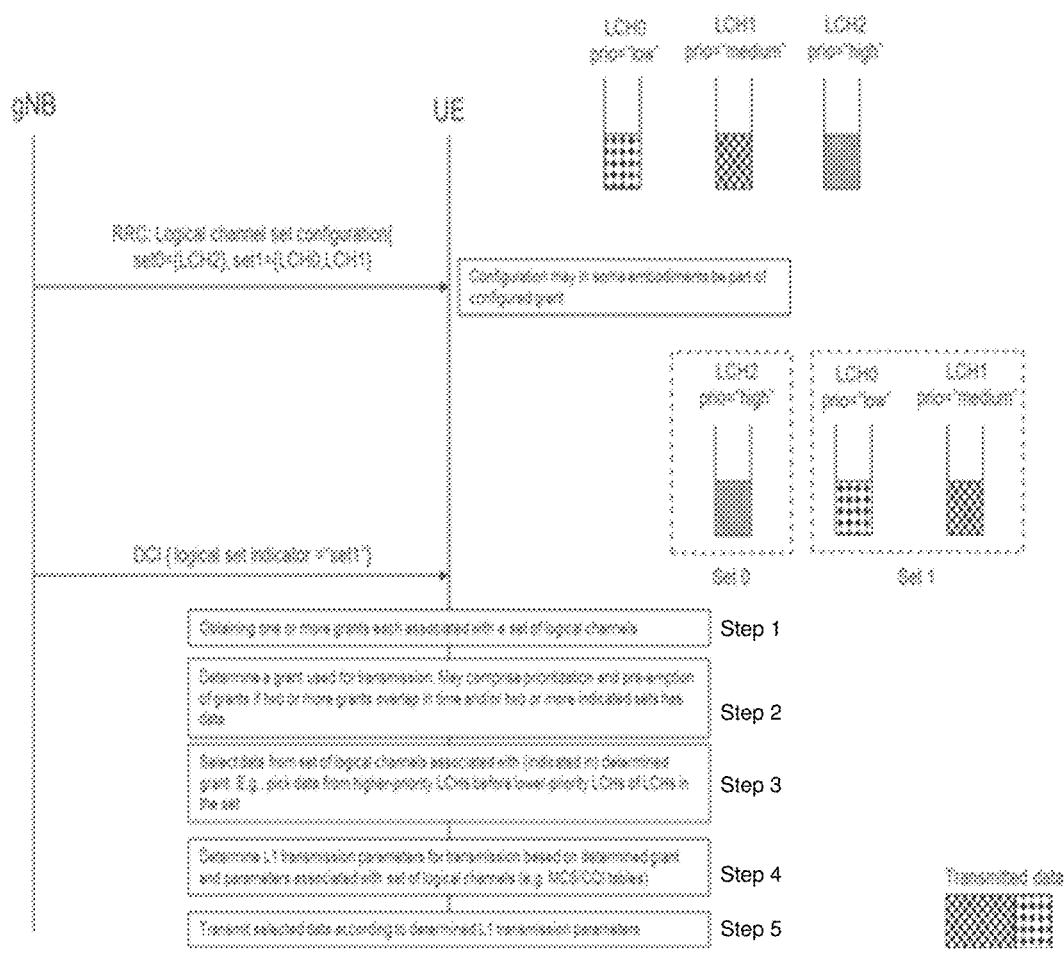
FIG. 9 illustrates a grant-based scenario according to some embodiments of the present disclosure.

An example scenario, illustrated in FIG. 9, is now described.

A WD 22 with two or more configured LCH sets may, in some embodiments, perform the following steps:
  Step 1: Obtain one or more grants, where each grant indicates an LCH set;
  Step 2: Determine that a given grant is to be used for transmission based on the priority (or relative priorities) of the corresponding subset of LCHs;
  Step 3: Select data from the LCHs in the subset indicated by the determined grant;
  Step 4: Determine L1 transmission parameters for transmission based on determined grants and parameters associated with LCHs in the subset; and
  Step 5: Build and transmit the selected data according to determined L1 transmission parameters.

In a "grant-based" scenario, the WD 22 may receive one grant for each transmission and there is only one grant obtained in Step 1. In Step 2 the determining is performed just to determine the grant obtained. In Step 3, however, the WD 22 may only select data from the subset of LCHs corresponding to the determined grant regardless of whether LCHs not in the subset have higher priority. This is different from legacy behavior where data from high-priority LCHs is always selected first. Hence, even if a high-priority LCH has data available for transmission, the data associated with the high-priority LCH will not be selected if that LCH is not included in the subset of LCHs indicated by the determined grant. In Step 4, L1 transmission parameters such as MCS/CQI table or power control parameters may be determined based on the determined grant and parameters associated with LCHs in the subset. In Step 5, the data is built and transmitted according to determined L1 transmission parameters.

If the subset of LCHs indicated by the determined grant includes two or more LCHs then data may be selected from the higher-priority LCH (within the subset) before the lower-priority LCH (within the subset) as in legacy selection.

Figure 10:
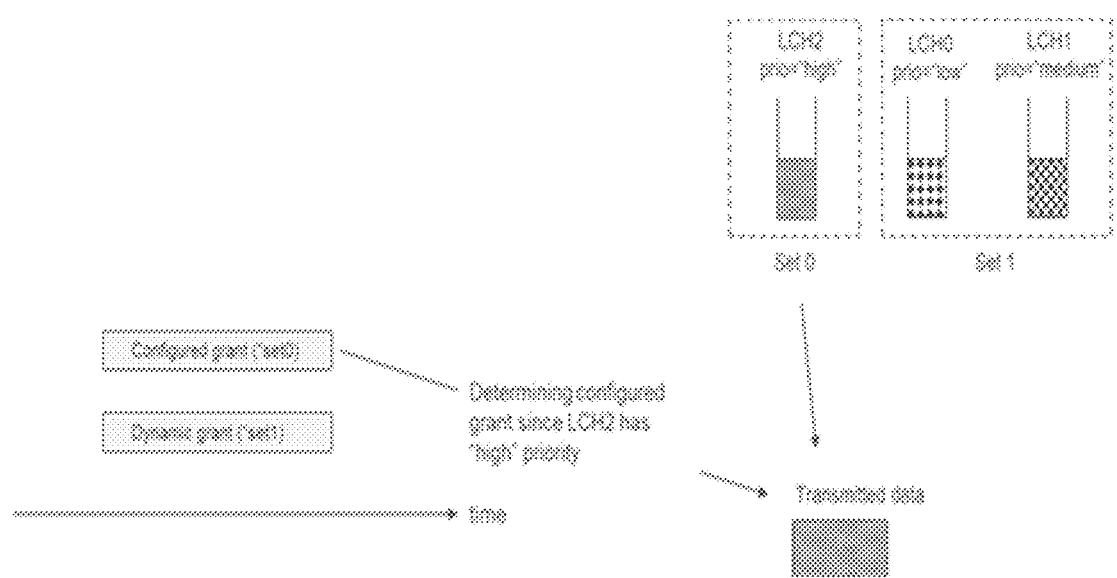
FIG. 10 illustrates a scenario using a configured grant according to some embodiments of the present disclosure.

In other scenarios, such as that shown in FIG. 10, the WD 22 is configured to use a configured grant. In such scenarios there may be two or more grants obtained in Step 1, where the two or more grants are contradictory. The contradiction may be that the obtained grants indicate time-overlapping transmissions that may not be supported by the WD 22. In such scenarios, the WD 22 may determine that only one of the grants is to be used for transmission based on the priority of the LCHs in the LCH subsets indicated by or corresponding to the grants. For example, if the first grant indicates a first subset of LCHs, where P1 is the highest priority among LCHs in the first subset, while a second grant indicates a second subset of LCHs, where P2 is the highest priority among LCHs in the second subset, then, if P2>P1, the WD 22 may determine that the second grant is to be used; otherwise the first grant is used.

Figure 11:
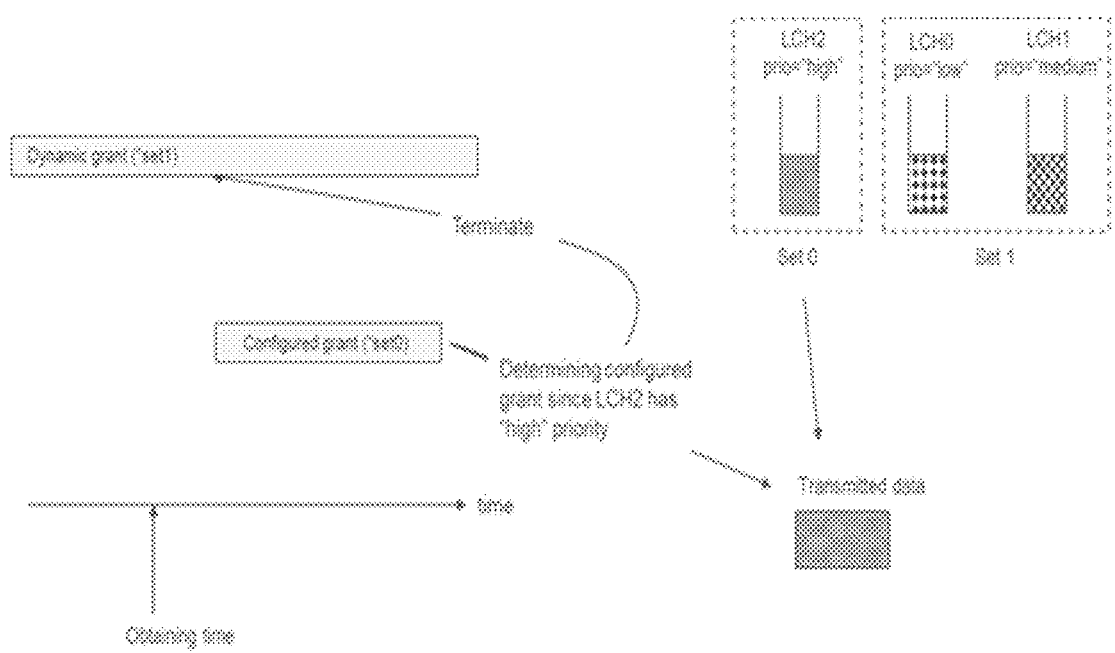
FIG. 11 illustrates an alternative scenario according to some embodiments of the present disclosure.

In other scenarios, for example as shown in FIG. 11, obtained grants in Step 1 may indicate a subset of LCHs where the obtained grant conflicts with (i.e., contradicts) an ongoing L1-processed grant (e.g., the determined grant is a dynamic grant and conflicts with a configured grant). In such scenarios, the WD 22 may trigger intra-UE pre-emption where the on-going L1-processed grant may be terminated or interrupted in favor of transmitting data associated with the subset of LCHs corresponding to the obtained grant.

In some scenarios, the WD 22 receives a grant comprising a CSI request. In some such scenarios, the WD 22 may refrain from transmitting CSI if the determined grant to be used for transmission is different from the grant comprising the CSI request. For example, if the determined grant is a configured grant and the CSI is requested in a dynamic grant, then the CSI may not be transmitted. In addition, if the determined grant is a second grant received after a first grant (but they overlap) and where the first grant comprises the CSI request but the second does not, then the CSI will not be transmitted.

Figure 12:
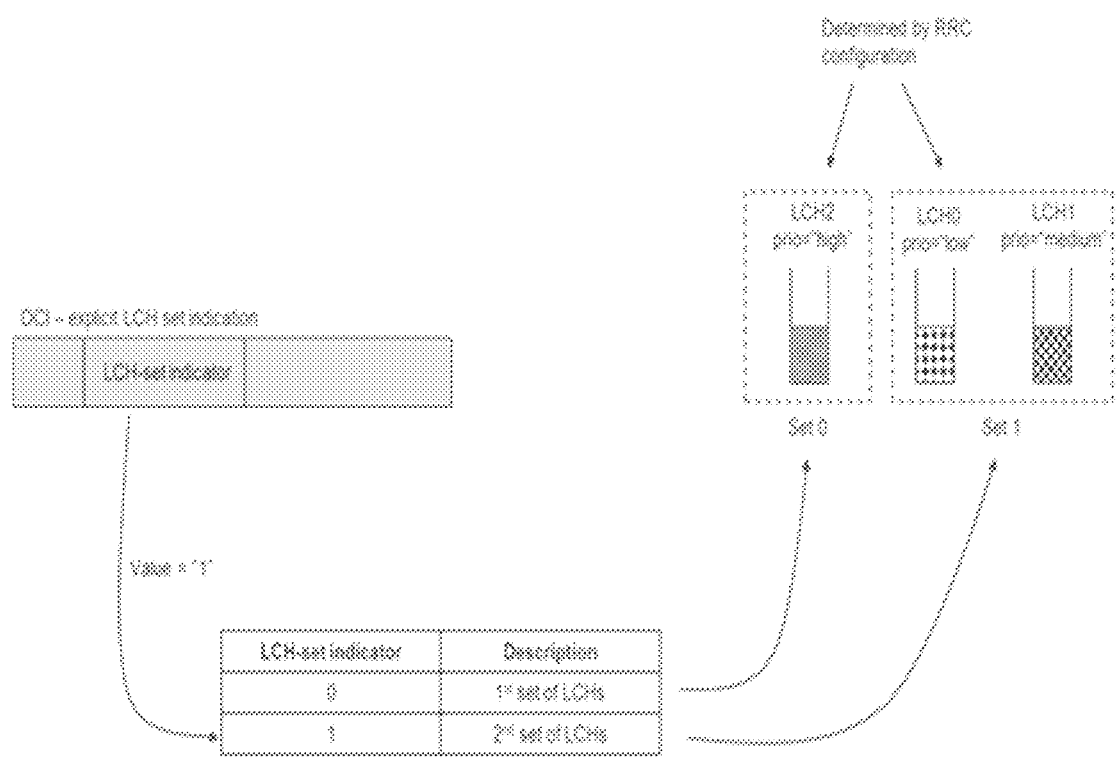
FIG. 12 illustrates an alternative scenario using an explicit LCH set indication according to some embodiments of the present disclosure.

The indication of LCH set can be explicit such that DCI comprises a field "LCH set indicator" as illustrated in FIG. 12.

In some embodiments, the indication is implicitly associated with a grant. For example, LCHs may be associated with specific DCI formats/formatting and/or how the DCI was received, e.g., which RNTI is used or on which CORE-SET/search space the DCI was received. A high priority LCH may, for example, be associated with a specific RNTI while other LCHs will be indicated with another RNTI. The LCH set indication may also be indicated using "RNTI-scrambling" of the DCI cyclic redundancy check (CRC) (in NR, a 16-bit RNTI is scrambled with 16-bits of the 24-bit DCI CRC; the un-scrambled bits of the DCI CRC can be scrambled with an LCH-set indicator).

In some embodiments, two grants are conflicting through overlapping resources and also cover the same LCH. The WD 22 having data on that LCH then uses the dynamic grant if one grant is dynamic and one configured, and the latest received dynamic grant if both grants are dynamic.

In another embodiment, the set of transmission parameters are not included in an "LCH set" and the L1 parameters are obtained from the grant. The grant from the network node 16 can indicate which "LCH set" can use this grant. How to indicate this is explained above. An example of addition in the medium access control (MAC) specification in TS 38.321 is as follows:

The MAC entity may, when a new transmission is performed:
  select the logical channels for each UL grant that satisfy all the following conditions:
  the set of allowed Subcarrier Spacing index values in allowedSCS-List, if configured, which includes the Subcarrier Spacing index associated with the UL grant;
  maxPUSCH-Duration, if configured, is larger than or equal to the PUSCH transmission duration associated to the UL grant;
  configuredGrantTypeIAllowed, if configured, is set to TRUE in case the UL grant is a Configured Grant Type 1;
  allowedServingCells, if configured, includes the Cell information associated to the UL grant; and
  If allowedLogicalChannelSet is included in the uplink transmission information received from lower layers for the corresponding scheduled uplink transmission, select only those logical channels in the logical set (where all of the logical channels in the logical set are RRC configured).

The Subcarrier Spacing index, PUSCH transmission duration and cell information may be included in uplink transmission information received from lower layers for the corresponding scheduled uplink transmission.

According to one aspect, a wireless device, WD 22, configured to communicate with a network node 16, includes processing circuitry 84 configured to receive from the network node 16, a first grant for uplink transmission of data, the first grant indicating that use of the first grant is restricted to logical channels (LCHs) of a first subset of LCHs of an LCH set, the first subset of LCHs configured to include fewer than all LCHs, such that there exists at least one LCH for which use of the first grant is not allowed. The processing circuitry 84 is further configured to select at least one LCH from the first subset of LCHs according to a priority of LCHs in the first subset of LCHs, the selected at least one LCH configured to provide data to be transmitted on the uplink according to the first grant.

According to this aspect, in some embodiments, the at least one LCH selected from the first subset of LCHs is an LCH having a highest priority of all the LCHs in the first subset of LCHs. In some embodiments, the processing circuitry is further configured to cause transmission of data on the selected at least one LCH from the first subset of LCHs on transmission resources indicated by the first grant, regardless of whether LCHs not in the first subset of LCHs have higher priority than the LCHs included in the first subset of LCHs. In some embodiments, the processing circuitry is further configured to: receive a second grant for uplink transmission, the second grant indicating a transmission time that overlaps a transmission time indicated by the first grant, the second grant indicating that use of the second grant is restricted to LCHs of a second subset of LCHs in the LCH set. The processing circuitry 84 is further configured to select, for transmission according to one of the two grants, data from an LCH that has a priority that is a highest priority within the subset of LCHs indicated by the one of the two grants, which priority is also higher than a priority of the LCH of highest priority within the other subset of LCHs. In some embodiments, the processing circuitry 84 is further configured such that the first grant is received when a second grant is already being processed results in disruption of the processing of the second grant while performing processing of the first grant. In some embodiments, when the first grant includes a channel state information, CSI, request, the WD 22 is configured to refrain from transmitting CSI when a grant to be used for transmission is different from the first grant. In some embodiments, the grant to be used for transmission is a configured grant and when the CSI is requested in a dynamic grant, the WD 22 is configured such that no CSI is transmitted. In some embodiments, when the grant to be used for transmission is a second grant received after the first grant, and the first grant includes a CSI request, and the second grant does not include a CSI request, the WD 22 is configured such that the CSI is not transmitted by the WD 22. In some embodiments, the first grant implicitly indicates by at least one of a specific downlink control information, DCI, format and how the DCI was received, that use of the first grant is restricted to LCHs of the first subset of LCHs. In some embodiments, when two received grants are conflicting because of overlapping resources and both grants indicate a same LCH, the WD 22 is configured to use a dynamic grant if one of the two grants is dynamic and the other grant is configured, and to use a latest received dynamic grant if both grants are dynamic.

According to another aspect, a method in a wireless device, WD 22, configured to communicate with a network node 16 is provided. The method includes receiving from the network node 16, a first grant for uplink transmission of data, the first grant indicating that use of the first grant is restricted to logical channels (LCHs) of a first subset of LCHs of an LCH set, the first subset of LCHs configured to include fewer than all LCHs, such that there exists at least one LCH for which use of the first grant is not allowed. The method further includes selecting at least one LCH from the first subset of LCHs according to a priority of LCHs in the first subset of LCHs, the selected at least one LCH configured to provide data to be transmitted on the uplink according to the first grant.

According to this aspect, in some embodiments, the at least one LCH selected from the first subset of LCHs is an LCH having a highest priority of all the LCHs in the first subset of LCHs. In some embodiments, the processing circuitry is further configured to cause transmission of data on the selected at least one LCH from the first subset of LCHs on transmission resources indicated by the first grant, regardless of whether LCHs not in the first subset of LCHs have higher priority than the LCHs included in the first subset of LCHs. In some embodiments, the processing circuitry is further configured to receive a second grant for uplink transmission of data, the second grant indicating a transmission time that overlaps a transmission time indicated by the first grant, the second grant indicating that use of the second grant is restricted to LCHs of a second subset of LCHs in the LCH set. In some embodiments, the processing circuitry 84 is further configured to select, for transmission according to one of the two grants, data from an LCH that has a priority that is highest priority within the subset of LCHs indicated by the one of the two grants, which priority is also higher than a priority of an LCH of highest priority within the other subset of LCHs. In some embodiments, the first grant is received when a second grant is already being processed results in disruption of the processing of the second grant while performing processing of the first grant. In some embodiments, when the first grant includes a channel state information, CSI, request, the WD 22 refrains from transmitting CSI when a grant to be used for transmission is different from the first grant. In some embodiments, when the grant to be used for transmission is a configured grant and the CSI is requested in a dynamic grant, then no CSI is transmitted. In some embodiments, when the grant to be used for transmission is a second grant received after the first grant, and wherein the first grant includes a CSI request, and the second grant does not include a CSI request, then the CSI is not transmitted by the WD 22. In some embodiments, the first grant implicitly indicates by at least one of a specific downlink control information, DCI, format and how the DCI was received, that use of the first grant is restricted to LCHs of the first subset of LCHs. In some embodiments, when two received grants are conflicting because of overlapping resources and both grants indicate a same LCH, a dynamic grant is used if one grant is dynamic and the other grant is configured, and if both grants are dynamic a latest received dynamic grant is used.

According to yet another aspect, a network node 16 configured to communicate with a wireless device, WD 22, includes processing circuitry 68 configured to generate at least one grant for uplink transmission of data for the WD 22, the at least one grant indicating that use of the at least one grant is restricted to logical channels (LCHs) of a first subset of at least one LCH of an LCH set, the first subset of LCHs including fewer than all LCHs, such that there exists at least one LCH for which use of the at least one grant is not allowed. The processing circuitry is further configured to transmit the at least one grant to the WD 22.

According to this aspect, in some embodiments, the at least one grant implicitly indicates by at least one of a specific downlink control information, DCI, format and how the DCI was received, that use of the first grant is restricted to LCHs of the first subset of LCHs. In some embodiments, the at least one grant indicates a set of layer one, L1, transmission parameters to be used by the WD 22. In some embodiments, the L1 transmission parameters are associated with the LCHs of the first subset of LCHs. In some embodiments, the processing circuitry 68 is further configured to send instructions to configure the WD 22 with the LCH set. In some embodiments, the processing circuitry 68 is further configured to configure the WD 22 with the LCH set by radio resource control, RRC, signaling. In some embodiments, the LCH set is preconfigured in the network node 16 and the WD 22.

According to another aspect, a method in a network node 16 configured to communicate with a wireless device, WD 22, is provided. The method includes generating at least one grant for uplink transmission of data for the WD 22, the at least one grant indicating that use of the at least one grant is restricted to logical channels, LCHs, of a first subset of LCH of an LCH set, the first subset of LCHs including fewer than all LCHs, such that there exists at least one LCH for which use of the at least one grant is not allowed. The method includes transmitting the at least one grant to the WD 22.

According to this aspect, in some embodiments, the at least one grant implicitly indicates by at least one of a specific downlink control information, DCI, format and how the DCI was received, that use of the first grant is restricted to LCHs of the first subset of LCHs. In some embodiments, the at least one grant indicates a set of layer one, L1, transmission parameters to be used by the WD 22. In some embodiments, the L1 transmission parameters are associated with the LCHs of the first subset of LCHs. In some embodiments, the processing circuitry 68 further sends instructions to configure the WD 22 with the LCH set. In some embodiments, the processing circuitry further configures the WD 22 with the LCH set by radio resource control, RRC, signaling. In some embodiments, the LCH set is pre-configured in the network node 16 and the WD 22.

According to one aspect, a network node 16 configured to communicate with a wireless device (WD) 22 is provided. The network node 16 has processing circuitry 68 configured to: instruct the WD 22 using radio resource control, RRC, signaling to configure at least one logical channel, LCH, set. Each LCH set includes at least one LCH and a set of transmission parameters. The processing circuitry 68 is further configured to generate at least one grant for the WD 22, each grant indicating an LCH set.

According to this aspect, in some embodiments, a grant of the at least one grant indicates a priority of an indicated LCH set. In some embodiments, LCHs in a set of LCHs are prioritized. In some embodiments, the set of transmission parameters includes at least one of a modulation and coding scheme, MCS, table, and a channel quality index, CQI, table.

According to another aspect, a method implemented in a network node 16 is provided. The method includes instructing the WD 22 using radio resource control, RRC, signaling to configure at least one logical channel, LCH, set, where each LCH set includes at least one LCH and a set of transmission parameters. The method further includes generating at least one grant for the WD, each grant indicating an LCH set.

According to yet another aspect, a wireless device (WD) 22 has processing circuitry 84 configured to obtain at least one grant from the network node 16, each grant of the at least one grant indicating a logical channel, LCH, set. Each LCH set includes at least one LCH and a set of transmission parameters. The processing circuitry 84 is further configured to: select a grant of the at least one grant to be used for transmission; select data from the at least one LCH indicated by the selected grant; determine Layer 1, L1, transmission parameters for transmission by the WD based on the selected grant; and transmit the selected data according to the L1 transmission parameters.

According to this aspect, in some embodiments, the selected grant is a grant having a corresponding set of at least one LCH having a highest priority. In some embodiments, the selected data is from a subset of the LCHs of the at least one LCH. In some embodiments, the transmission parameters include at least one of a modulation and coding scheme, MCS, table, and a channel quality index, CQI, table.

According to yet another aspect, a method implemented in a wireless device (WD) 22 includes obtaining at least one grant from the network node, each grant of the at least one grant indicating a logical channel, LCH, set, where each LCH set includes at least one LCH and a set of transmission parameters. The method further includes selecting a grant of the at least one grant to be used for transmission and selecting data from the at least one LCH indicated by the selected grant. The method further includes determining Layer 1, L1, transmission parameters for transmission by the WD based on the selected grant and transmitting the selected data according to the L1 transmission parameters.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
CORESET Control Region Set
CSI Channel State Information
CQI Channel Quality Index
DCI Downlink Control Information
DL Downlink
eMBB Enhanced Mobile BroadBand
LTE Long-Term Evolution
MCS Modulation and Coding Scheme
NR New Radio
PUCCH Physical Uplink Control CHannel
PUSCH Physical Uplink Shared CHannel
PRB Physical Resource Block
RNTI Radio Network Temporary Identity
RRC Radio Resource Control
SR Scheduling Request
TBS Transport Block Size
UCI Uplink Control Information
UL Uplink
URLLC Ultra-Reliable Low-Latency Communication It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device, WD, configured to communicate with a network node, the WD comprising processing circuitry configured to:
   receive from the network node, a first grant for uplink transmission of data, the first grant indicating that use of the first grant is restricted to logical channels, LCHs, of a first subset of LCHs of an LCH set, the first subset of LCHs configured to include fewer than all LCHs, such that there exists at least one LCH for which use of the first grant is not allowed;
   select at least one LCH from the first subset of LCHs according to a priority of LCHs in the first subset of LCHs, the selected at least one LCH configured to provide data to be transmitted on the uplink according to the first grant; and
   when the first grant includes a channel state information, CSI, request, refrain from transmitting CSI when a grant to be used for transmission is different from the first grant.

2. The WD of claim 1, wherein the at least one LCH selected from the first subset of LCHs is an LCH having a highest priority of all the LCHs in the first subset of LCHs.

3. The WD of claim 1, wherein the processing circuitry is further configured to cause transmission of data from the selected at least one LCH from the first subset of LCHs on transmission resources indicated by the first grant, regardless of whether LCHs not in the first subset of LCHs have higher priority than the LCHs included in the first subset of LCHs.

4. The WD of claim 1, wherein the processing circuitry is further configured to:
   receive a second grant for uplink transmission of data, the second grant indicating a transmission time that overlaps a transmission time indicated by the first grant, the second grant indicating that use of the second grant is restricted to LCHs of a second subset of LCHs in the LCH set; and
   select, for transmission according to one of the two grants, data from an LCH that has a priority that is a highest priority within the subset of LCHs indicated by the one of the two grants, which priority is also higher than a priority of an LCH of highest priority within the other subset of LCHs.

5. The WD of claim 1, wherein the processing circuitry is further configured such that the first grant being received when a second grant is already being processed results in disruption of the processing of the second grant while performing processing of the first grant.

6. The WD of claim 1, wherein, when the grant to be used for transmission is a configured grant and the CSI is requested in a dynamic grant, the WD is configured such that no CSI is transmitted.

7. The WD of claim 1, wherein, when the grant to be used for transmission is a second grant received after the first grant, and the first grant includes a CSI request, and the second grant does not include a CSI request, the WD is configured such that the CSI is not transmitted by the WD.

8. The WD of claim 1, wherein the first grant implicitly indicates, by at least one of a specific downlink control information, DCI, format and how the DCI was received, that use of the first grant is restricted to LCHs of the first subset of LCHs.

9. The WD of claim 1, wherein, when two received grants are conflicting because of overlapping resources and both grants indicate a same LCH, the WD is configured to use a dynamic grant if one of the two grants is dynamic and the other grant is configured, and to use a latest received dynamic grant if both grants are dynamic.

10. A method in a wireless device, WD, configured to communicate with a network node, the method comprising:
    receiving from the network node, a first grant for uplink transmission of data, the first grant indicating that use of the first grant is restricted to logical channels, LCHs, of a first subset of LCHs of an LCH set, the first subset of LCHs configured to include fewer than all LCHs, such that there exists at least one LCH for which use of the first grant is not allowed;
    selecting at least one LCH from the first subset of LCHs according to a priority of LCHs in the first subset of LCHs, the selected at least one LCH configured to provide data to be transmitted on the uplink according to the first grant; and
    when the first grant includes a channel state information, CSI, request, refraining from transmitting CSI when a grant to be used for transmission is different from the first grant.

11. A network node configured to communicate with a wireless device, WD, the network node comprising processing circuitry configured to:

generate at least one grant for uplink transmission of data for the WD, the at least one grant indicating that use of the at least one grant is restricted to logical channels, LCHs, of a first subset of LCHs of an LCH set, the first subset of LCHs including fewer than all LCHs, such that there exists at least one LCH for which use of the at least one grant is not allowed;

transmit the at least one grant to the WD; and when the first grant includes a channel state information, CSI, request, configure the WD to refrain from transmitting CSI when a grant to be used for transmission is different from the first grant.

12. The network node of claim 11, wherein the at least one grant implicitly indicates, by at least one of a specific downlink control information, DCI, format and how the DCI was received, that use of the first grant is restricted to LCHs of the first subset of LCHs.

13. The network node of claim 11, wherein the at least one grant indicates a set of layer one, L1, transmission parameters to be used by the WD.

14. The network node of claim 13, wherein the L1 transmission parameters are associated with the LCHs of the first subset of LCHs.

15. The network node of claim 11, wherein the processing circuitry is further configured to send instructions to configure the WD with the LCH set.

16. The network node of claim 15, wherein the processing circuitry is further configured to configure the WD with the LCH set by radio resource control, RRC, signaling.

17. The network node of claim 15, wherein the LCH set is pre-configured in the network node and the WD.

18. A method in a network node configured to communicate with a wireless device, WD, the method comprising:

generating at least one grant for uplink transmission of data for the WD, the at least one grant indicating that use of the at least one grant is restricted to logical channels, LCHs, of a first subset of LCHs of an LCH set, the first subset of LCHs including fewer than all LCHs, such that there exists at least one LCH for which use of the at least one grant is not allowed;

transmitting the at least one grant to the WD; and when the first grant includes a channel state information, CSI, request, configuring the WD to refrain from transmitting CSI when a grant to be used for transmission is different from the first grant.

* * * * *